Dec. 15, 1959    O. STETTLER    2,917,708
ELECTRICITY METER
Filed March 7, 1955

INVENTOR.
OSKAR STETTLER
BY
AGENT.

United States Patent Office 2,917,708
Patented Dec. 15, 1959

2,917,708

ELECTRICITY METER

Oskar Stettler, Zurich, Switzerland, assignor, by mesne assignments, to North American Philips Company, Inc., New York, N.Y., a corporation of Delaware Application March 7, 1955, Serial No. 492,577

Claims priority, application Switzerland March 13, 1954

10 Claims. (Cl. 324—137)

Alternating current meters of the usual type are customarily built according to the Ferraris principle. An aluminum rotor disc with a vertical spindle rotates in the air-gap of a driven system which comprises current and voltage coils and, in combination with Foucault-currents induced in the rotor disc, produces a torque which is proportional to the power supplied to the load. Furthermore, an auxiliary rotary field generated by the voltage armature permits the counter torques of the rotor and of the driving means for the counting mechanism to be substantially compensated. A powerful brake magnet also acting on the rotor disc provides that the drive and the brake-moment are in equilibrium at comparatively low angular velocity of the rotor.

The torque (counter torque) due to friction in the bearings and air-friction and counteracting the driven torque is, in general, not proportional to the angular velocity of the rotor and is, moreover, subject to variations and modifications on account of internal and external influences by which the measuring accuracy is adversely affected. Such influences are, for example, the slope of the rotor spindle relative to the vertical, wear and fouling of the bearing and driving parts, variation of the driving moment of the counting mechanism in simultaneously switching a variable number of counting rolls and so on. In order that, despite said variable influences, the measuring accuracy may be kept between permissible limits the driving torque of the Ferraris armature and the oppositely acting brake moment of the brake magnet should be such that said modifications and variations of the counter torques of the rotor and of the driving means for the counting mechanism are small relative to the driving and braking moments so that they are negligible within the usual measuring accuracy. The strong drive and brake fields required to attain this end can only be produced by correspondingly proportioned drive and brake systems, so that not only the rotor disc but also the whole meter are bulky.

In order to obtain the required strong magnetic fields, attention has been directed to minimizing the airgaps which, in turn, necessitate corresponding fine-control devices, the small airgaps moreover involving disturbing voltage reactions.

The present invention has for its object to minimize the size of the meter, while avoiding the said disadvantages of known meters.

It has been proposed to house the rotor for an electricity meter in an evacuated vessel in order to reduce air-friction as much as possible, the field and brake magnet systems being arranged outside the vessel. In such devices, the housing of the rotor and the transmission of the rotor movement to the counting mechanism entails serious difficulties. It has been proposed to provide a magnetic coupling between the shaft of the counter and a shaft of the counting mechanism by means of magnets, but thereby the weight of the rotor and consequently the friction of the bearing is increased.

The invention consists in that the weight of the rotor is taken up by a magnetic suspension system arranged to center the rotor in an axial direction, and the rotor with associated bearing parts is enclosed in a vessel made from electrically insulating material and filled with dilute gas.

It is known per se to use magnetic suspension bearings for electricity meters. However, the difficulties experienced in known meters are avoided to a high degree only by housing also the rotor and the associated bearing parts in a vessel filled with dilute gas, which moreover permits of minimizing not only the size of the rotor but also of the driving and braking members and consequently of the whole meter. This is particularly true if a suspension bearing of said type provided at the lower end of the rotor spindle exerts on the rotor an upwardly directed force slightly exceeding gravity, the resulting upwardly directed force component being taken up by a point resting in a bearing cup.

The magnetic suspension system comprises a stationary magnet and a magnet forming part of the rotor. The stationary magnet may either be arranged outside or inside the vessel. In the first-mentioned case, the bearing pressure in the point bearing is easy to adjust by axial displacement of the stationary magnet. In the last-mentioned case, it is advantageous to mount the rotor and all the bearing parts in a frame which, during manufacture. is assembled with a vessel portion comprising suitable centering members.

The use of a magnetic suspension bearing alone hardly permits the size of the meter to be considerably reduced, due to the fact that air-friction is rather increased and not reduced on account of the rotating magnets. When using a vessel filled with gas at a low pressure the air friction losses are considerably reduced. In this case it is possible for the driving moment and the braking moment to be greatly reduced with the same measurement accuracy, so that the active rotor part may also have a much smaller diameter, thus reducing the total-weight of the active rotor part. Hence, the weight of the movable part of the magnetic suspension system is very low, for example only a few grams. A proper choice of the magnetic axial pressure and the use of a point bearing at the upper end of the spindle render the axial pressure of the point bearing extremely low and lubrication superfluous.

It has been found that an oxide permanent magnet material as described in British patent 708,127 is very suitable as a material for the two parts of the suspension bearing. Said material has a low specific weight and a low conductivity, thus reducing the total weight of the rotor, whilst uncontrollable Foucault currents in the active parts of the magnetic suspension bearing are practically harmless.

The drive- and brake-systems are arranged outside the vessel. In order that the gap between the rotor part co-acting with said systems on the one hand and these systems on the other hand be not too wide the wall of the housing should surround the rotor disc as closely as possible. It is in the nature of the magnetic suspension bearing that external radial forces influencing the rotor may involve a permanent force of random eccentricity of the spindle exceeding that of step bearings. In order to prevent such eccentricity giving rise to distance variations between the active motor part and the adjacent part of the wall of the housing the active rotor part is preferably shaped as a hollow sphere segment, the centre of which coincides with the point of the axial point bearing.

In the conventional meters, the upper guide bearing and the lower bearing, as well the drive and brake members are carried by separate supports. The use of a vessel permits the employment of this vessel as a support both of the inner members and the outer drive and brake systems. This is particularly true when using for the meter drive a winding system of the type of an asynchronous motor with phase displaced auxiliary phase windings, in which the latter is used as a voltage winding.

In ordinary electricity meters the friction in the counting mechanism is considerable. This is of much greater importance if, as in the meter in accordance with the invention, the measuring member rotates substantially frictionless. Since in the meter in accordance with the invention the rotor is enclosed in an evacuated vessel or a vessel filled with gas at a low pressure, it is possible, in accordance with the invention, to count the revolutions in a given time by driving the counting mechanism by means of a source of power, particularly the mains, which is controlled substantially without energy by the measuring member. To this end the rotor may comprise devices by which, during rotation of the rotor, a discharge path between electrodes, which are sealed into the wall of the vessel, is intermittently opened and closed, the current impulses thus produced controlling, either directly or remotely, an electromagnetic step-switch counting mechanism by which the rotor is substantially loaded mechanically.

In order that the invention may be readily carried into effect it will now be described with reference to the accompanying drawing, given by way of example, in which Fig. 1 is a sectional view of a rotor housed in a vessel in accordance with the invention.

Figure 1:
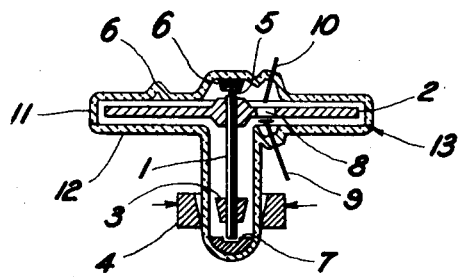

The system shown in Fig. 1 comprises a Ferraris disc 2 secured to a vertical spindle 1. This spindle carries at its lower end a ring 3 of ferromagnetic material, preferably a ferromagnetic oxide mixture. At its upper end the spindle has a point 5 which is guided by a stone cup 6. The ring 3 constitutes the rotor of a magnetic suspension bearing, the stator of which is constituted by a ring 4 surrounding the rotor 3 and made from the same material as that of the ring 3. The outer surface of the rotor 3 and the inner surface of the stator 4 are conical. The two permanent magnetic rings are magnetised in a radial sense in such manner, as indicated by arrows, that poles of the same polarity face each other. The upwardly directed magnetic force slightly exceeds the weight of the rotor so that the point 5 rests against the stone cup 6 at a slight pressure.

The disc 2 with spindle 1 is made from pure aluminum and provided with an insulating oxide layer by anode-oxidation. The proportions are preferably smaller than half that used in meters of the usual type.

The rotary part of the meter with the rotor 3 of the magnetic suspension system, the point bearings 5, 6 and a limiter or stop 7 are housed in an evacuated vessel consisting of parts 11 and 12 and preferably made from glass. The parts 11 and 12 are connected together in a vacuum-tight manner by means of an enamel-like layer 13 having a low melting point. The stator 4 of the magnetic suspension system is slidably mounted on the tubular part of the portion 12 of the housing, so that the pressure is adjustable in the point bearing.

The vessel 11, 12 is evacuated and degassed by means of a pump nozzle 14 through methods known per se such as, for example, high frequency heating of the enclosed parts, vaporisation of the getter material and so on, the vessel subsequently being filled with a suitable gas such as, for example, Hg, He, Ne, A, or Kr at a low pressure.

Figure 2:
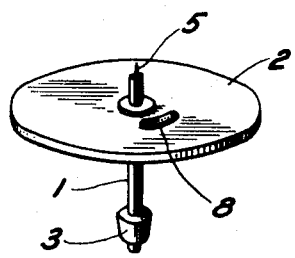
Fig. 2 shows the rotor disc with spindle.

Sealed into the wall of the vessel are two opposite electrodes 9, 10 capable, as described later, of closing a control-circuit for the counting mechanism. The Ferraris disc 2 has an opening 8 (see also Fig. 2) which momentarily releases or closes the discharge path between the electrodes 9 and 10 once during each revolution.

The gas mixture and the gas pressure of the vessel as well as the shape and the nature of the electrodes 9 and 10 correspond to the technique (molybdenum electrodes) adopted for the manufacture of cold-cathode tubes. By shaping the electrodes in a particular manner (pointed electrode 10, flat electrode 9) a rectifying effect is preferably aimed at.

The disc and its housing should be so shaped that the discharge, in rotor positions in which the opening 8 is not in line with the electrodes, does not follow the devious path along the rotor edge. A proper choice of the voltage in the electrode-circuit serves the same purpose. It may be advantageous to reduce the mains voltage occurring in the meter to a suitable value for the gas-discharge by means of a potentiometer or to increase it, for example by means of a voltage winding in the form of an auto-transformer. In view of the low-current strength in the discharge circuit the voltage for the discharge circuit may alternatively be taken from a tapping of the voltage coil of the driving system.

Sometimes it is advisable to provide an auxiliary anode in one electrode chamber, which anode enables continuity of the ionisation through a sufficiently high resistor and any further auxiliary means. The use of a layer of radio-active materials on the electrodes may serve the same purpose.

Between the electrodes 9 and 10, the control circuit for the counting mechanism is intermittently closed or interrupted in accordance with the speed of the disc. The drive and brake systems are omitted in Fig. 1. As is usual, they may consist of magnet systems surrounding the disc and arranged outside the housing (see also Fig. 3). Since the counter torque is reduced to a fraction of the value in ordinary electricity meters, a very low driving moment is sufficient to make the disc rotate. The driving system and consequently the brake system may thus have surprisingly small dimensions.

Figure 3:
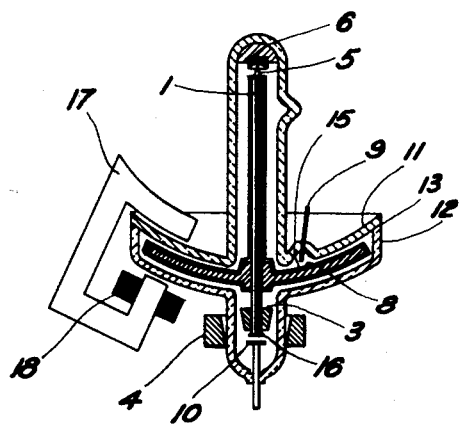
Figs. 3 and 4 show modified forms.

Fig. 3 shows the form of the rotor. The active rotor part is shaped as a sphere segment, the centre of the associated virtual sphere coinciding with the point 5 of the bearing 5, 6. The discharge vessel 11, 12 is adapted to said shape of the rotor.

As a result of the shape and arrangement of the rotor and vessel shown in Fig. 3 it is achieved that any eccentricity or rocking of the rotor spindle in the range of the radially acting limiter (vessel wall) neither involves distance variations between the rotor surface and the inner wall of the vessel nor variations in the path of the lines of force between the drive and brake system on the one hand and the rotor segment on the other hand.

The arcuate vessel parts surrounding the rotor segment foster the resistivity of the evacuated vessel against external atmospheric pressure.

In the construction shown in Fig. 3, the drive system 17, 18 and the brake system may also surround the active rotor portion in such manner that the lines of force enter at one side of the segment and issue on the other side. It will often be sufficient to arrange said systems on one side such that the lines of force enter and emerge on the same side of the segment.

Instead of providing the opening 8 (Fig. 2), which permits the passage of a discharge between the electrodes 9 and 10 arranged opposite each other on either side of the rotor over a given sector of a complete rotor revolution, the rotor of the construction shown in Fig. 3 is periodically inserted itself in the discharge circuit. An insulating layer covering the rotor is omitted in the zone of the opening 8 in the example referred to (Fig. 1). Said part of the surface may be provided with a conductive molybdenum plate 15 secured to the rotor body. Secured to the cross-cut surface of the lower end of the spindle is similarly provided a molybdenum plate 16 situated in front of the stationary electrode 10 (in the present example, the latter moreover acts as an axial limiter for the bearings 3, 4).

In the time periods, periodically returning during each revolution of the rotor, during which periods the plate 15 is situated right in front of the electrode 9, the control current flows from the voltage supply to the electrode 9, thence along the discharge path 9, 15 through the core metal of the rotor to the molybdenum electrode 16, thence via the discharge path 16, 10 and finally from the electrode 10 via the control winding of the counting mechanism to the other terminal of the voltage supply.

Figure 4:
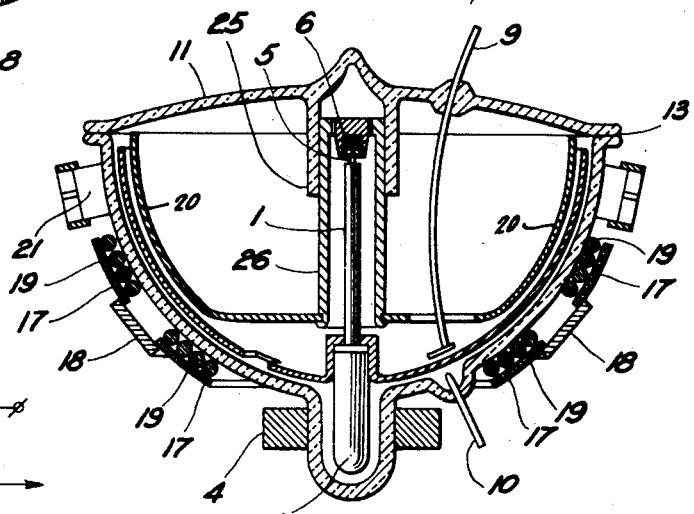

Fig. 4 shows a further form of the rotor and the discharge vessel. In this case, the vessel moreover carries a current winding 19 and a voltage winding 17 which are provided outside the vessel similarly to an asynchronous motor with leading current in the auxiliary winding. The windings may be connected together and to the vessel by means of cement. To conduct the flux, strips 18 of ferromagnetic material are arranged outside the vessel, a strip 20 of the same material being provided internally of the housing. The latter strip is supported by a bushing 26 which is guided in a tubular portion 25 of the upper part of the glass vessel. Said bushing moreover serves to support the stone cup 6 of the point bearing.

The example shown in Fig. 4 moreover differs from that shown in Fig. 3 in that the magnetic suspension system consists of two parts which are magnetised in the same sense. The motor is a rod magnet, its centre being slightly above that of the stator ring.

Figure 5:
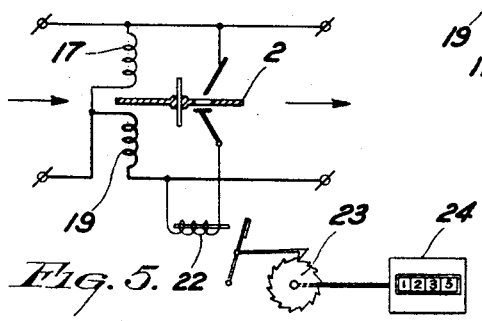
Fig. 5 shows diagrammatically how the counting mechanism is driven.

The circuit-arrangement of the device referred to, that is to say a single-phase, single-tariff meter is shown in Fig. 5. The electro-magnet system 17, 19, which produces the rotating field, and the brake magnets 21 are secured to the periphery of the rotor housing. The voltage coil 17 and the current coil 19 are connected in the usual way.

In this device, the current through the voltage coil exhibits a lagging phase-displacement of approximately 90° relative to the mains voltage, the circuit of the voltage coil being inductive.

Figure 6:
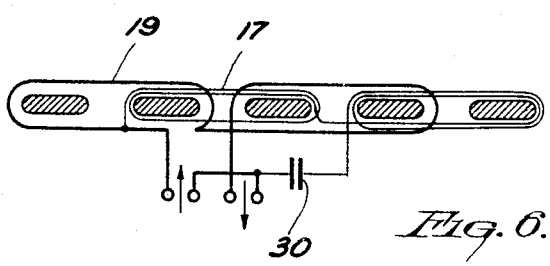
Fig. 6 shows a modified circuit-arrangement for the driving system.

When using the device shown in Fig. 4 it may, however, be advantageous to connect the voltage coil 17 through a capacitor 30 between the mains terminals, the dimensions being such that the current through the voltage coil leads approximately 90° with respect to the mains voltage. The circuit-arrangement concerned is shown in Fig. 6 in which the current and voltage coils are exploded in the plane of the drawing.

The discharge path controlled by rotation of the rotor is connected in series with a step-switch mechanism comprising a relay 22 (Fig. 5) behind the current coil 19, to the mains voltage, thus ensuring that the rotor at no load slowly rotates further until the rotor interrupts the control current. The exciter coil of relay 22 serves moreover as a series-connected impedance for the discharge between the electrodes 9 and 10 with the result that the control circuit has a positive current-versus-voltage characteristic.

During each rotor revolution the armature of the step switch 22 controls a pawl which, in turn, advances a ratchet wheel 23 one tooth. Said ratchet wheel is connected, either directly or through an additional switch or transmission gear, to the counting mechanism 24.

It will be evident that other known driving means may alternatively be used for the counting mechanism.

Electrical transmission of the speed of the rotor to the step-switch counting mechanism has the additional advantage that the relative position and spacing of the rotor and the counting mechanism are not determined by mechanical transmission means. Since the rotor unit and the associated counting mechanism are only connected through control lead, the rotor unit can be spatially separated from the counting mechanism. This permits the counting mechanism of a large number of rotor units, which are connected at suitable points in the main circuits, to be united in a central control point. Wireless transmission of the control impulses by means of a carrier may alternatively be substituted for the connection through a conductor between the rotor unit and the counting mechanism. As a further alternative, a plurality of counting mechanisms and associated step-switch relays may be connected, either directly or through a control relay, in parallel with a rotor unit. Naturally, electrical switching to counting mechanisms with different tariffs is possible, by means of switch-clocks or remotely controlled systems. Furthermore, counters in accordance with the invention may alternatively be built for three-phase current, both for evenly loaded and unevenly loaded phases.

Reference is made to a copending application, Serial No. 492,576, filed December 8, 1955, in which application other features of the constructions described herein are claimed.

What is claimed is:

1. An electricity meter comprising a hermetically sealed housing, a gas-filling at a given pressure in said housing, a rotor member positioned to rotate within said housing, bearing means for supporting said rotor in a vertical position including magnetic means providing magnetic forces for supporting the lower portion of said rotor member free of contact with other members, and centering means coacting with the upper portion of said rotor member, a conductive plate-like member having the shape of a segment of a hollow sphere concentric with the centering means and symmetrical about and secured to the rotor, field-producing means in close proximity to and on opposite sides of said plate-like member for rotating the same, a pair of electrodes on opposite sides of said plate-like member, said plate-like member having a portion thereof which when aligned with said electrodes defines a discharge path through said gas-filling, and means to intermittently produce a discharge between said electrodes as said rotor rotates for counting the number of revolutions of the rotor.

2. An electricity meter comprising a hermetically sealed housing, a gas-filling at a given pressure in said housing, a rotor member positioned to rotate within said housing, bearing means for supporting said rotor in a vertical position including magnetic means providing magnetic forces for supporting the lower portion of said rotor member free of contact with other members, and centering means coacting with the upper portion of said rotor member, a conductive plate-like member having the shape of a segment of a hollow sphere concentric with the centering means and symmetrical about and secured to the rotor, field-producing means in close proximity to and on opposite sides of said plate-like member for rotating the same, a pair of insulated electrodes sealed and extending into said housing on opposite sides of said plate-like member, said plate-like member having a portion thereof which when aligned with said electrodes defines a discharge path through said gas-filling, means to apply a potential between said electrodes at which a discharge occurs therebetween during each revolution of the rotor, and counting means coupled to said electrodes which are responsive to the discharge for counting revolutions of said rotor.

3. An electricity meter comprising a hermetically sealed housing, a gas-filling at a given pressure in said housing, a rotor member positioned to rotate within said housing, bearing means for supporting said rotor in a vertical position including magnetic means providing magnetic forces for supporting the lower portion of said rotor member free of contact with other members, and centering means coacting with the upper portion of said rotor member, a conductive plate-like member having the shape of a segment of a sphere concentric with said centering means and symmetrical about and secured to the rotor and having at least one aperture therein, field-producing means in close proximity to and surrounding a portion of said plate-like member for rotating the same, a pair of insulated electrodes sealed and extending into said housing on opposite sides of said plate-like member defining a discharge path through said aperture in said plate-like member and said gas-filling, means to apply a potential between said electrodes at which a discharge occurs therebetween during each revolution of the rotor, and counting means coupled to said electrodes which are responsive to the discharge for counting revolutions of said rotor.

4. An electricity meter comprising a hermetically sealed housing, a gas-filling at a given pressure in said housing, a rotor member positioned to rotate within said housing, bearing means for supporting said rotor in a vertical position including magnetic means providing magnetic forces for supporting the lower portion of said rotor member free of contact with other members, and centering means coacting with the upper portion of said rotor member, a conductive plate-like member having the shape of a segment of a sphere concentric with said centering means and symmetrical about and secured to the rotor and having at least one aperture therein, field-producing means in close proximity to and on opposite sides of said plate-like member for rotating the same, a pair of insulated cold electrodes sealed and extending into said housing on opposite sides of said plate-like member defining a discharge path through said aperture in said plate-like member and said gas-filling, means to apply a potential between said electrodes at which a discharge occurs therebetween during each revolution of the rotor, and counting means coupled to said electrodes which are responsive to the discharge for counting revolutions of the rotor.

5. An electricity meter comprising a hermetically sealed housing, a gas-filling at a given pressure in said housing, a rotor member positioned to rotate within said housing, bearing means for supporting said rotor in a vertical position including magnetic means providing magnetic forces for supporting the lower portion of said rotor member free of contact with other members, and centering means coacting with the upper portion of said rotor member, an aluminum plate-like member having the shape of a segment of a sphere concentric with said centering means and symmetrical about and secured to the rotor and having an oxidic coating thereon and an aperture therein, field-producing means in close proximity to and on opposite sides of said plate-like member for rotating the same, a pair of insulated cold electrodes sealed and extending into said housing on opposite sides of said plate-like member and defining a discharge path through said aperture in said plate-like member and said gas-filling, means to apply a potential between said electrodes at which a discharge occurs therebetween during each revolution of the rotor, and counting means coupled to said electrodes which are responsive to the discharge for counting revolutions of the rotor.

6. An electricity meter comprising a hermetically sealed housing, a gas-filling at a given pressure in said housing, a rotor member positioned to rotate within said housing, bearing means for supporting said rotor in a vertical position including magnetic means providing magnetic forces for supporting the lower portion of said rotor member free of contact with other members, and centering means coacting with the upper portion of said rotor member, an aluminum plate-like member having the shape of a segment of a sphere concentric with the centering means and symmetrical about and secured to the rotor and having an oxidic coating thereon, at least one portion of said coating being removed to expose the aluminum base, field-producing means in close proximity to and on opposite sides of said plate-like member for rotating the same, an insulated cold electrode sealed and extending into said housing on one side of said plate-like member and defining with said rotor a discharge path through said aluminum plate and said gas-filling, and means to apply a potential between said electrode and said rotor at which a discharge occurs therebetween during each revolution of the rotor, and counting means coupled to said electrode and said rotor which are responsive to the discharge for counting revolutions of the rotor.

7. An electricity meter comprising a hermetically sealed housing, a gas-filling at a given pressure in said housing, a rotor member positioned to rotate within said housing, bearing means for supporting said rotor in a vertical position including magnetic means providing magnetic forces for supporting the lower portion of said rotor member free of contact with other members, and centering means coacting with the upper portion of said rotor member, a conductive plate-like member having the shape of a segment of a sphere concentric with said centering means and symmetrical about and secured to the rotor, field-producing means in close proximity to and on opposite sides of said plate-like member for rotating the same, a pair of insulated cold electrodes sealed and extending into said housing on opposite sides of said plate-like member and defining a discharge path through said gas-filling, one of said electrodes having a pointed end and the other a flattened end for producing a uni-directional discharge, said plate-like member having a portion thereof which when aligned with said electrodes defines a discharge path through said gas-filling means to apply a potential between said electrodes at which a discharge occurs therebetween during each revolution of the rotor, and counting means coupled to said electrodes which are responsive to the discharge for counting revolutions of the rotor.

8. An electricity meter comprising a hermetically sealed housing, a gas-filling at a given pressure in said housing, a rotor member positioned to rotate within said housing, bearing means for supporting said rotor in a vertical position including magnetic means providing magnetic forces for supporting the lower portion of said rotor member free of contact with other members, and centering means coacting with the upper portion of said rotor member, a conductive plate-like member having the shape of a spherical segment concentric with said centering means and symmetrical about and secured to the rotor, field-producing means in close proximity to and on opposite sides of said plate-like member for rotating the same, a pair of electrodes having molybdenum surface portions sealed and extending into said housing on opposite sides of said plate-like member, said plate-like member having a portion thereof which when aligned with said electrodes defines a discharge path through said gas-filling, means to apply a potential between said electrodes at which a discharge occurs therebetween during each revolution of the rotor, and counting means connected to said electrodes and responsive to the discharge for counting revolutions of the rotor.

9. An electricity meter comprising a hermetically sealed housing, a gas-filling at a given pressure in said housing, a rotor member positioned to rotate within said housing, bearing means for supporting said rotor in a vertical position including magnetic means providing magnetic forces for supporting the lower portion of said rotor member free of contact with other members, and centering means coacting with the upper portion of said rotor member, a conductive plate-like member having the shape of a segment of a hollow sphere concentric with the centering means and symmetrical about and secured to the rotor, field-producing means in close proximity to and on opposite sides of said plate-like member for rotating the same, said field-producing means comprising a first winding in series with an external circuit for producing a field proportional to the current in said circuit and a second winding in parallel with said circuit for producing a field proportional to the potential across said circuit, and a capacitor in series with said latter winding, said capacitor having a capacitance at which the current flowing through said winding leads by 90° the current flowing through said first winding, a pair of electrodes sealed in and extending into said housing on opposite sides of said plate-like member, said plate-like member having a portion thereof which when aligned with said electrodes defines a discharge path through said gas-filling, means to apply a potential between said electrodes at which a discharge occurs therebetween during each revolution of the rotor, and counting means responsive to the discharge for counting revolutions of the rotor.

10. An electricity meter comprising a hermetically sealed housing, a gas-filling at a given pressure in said housing, a rotor member positioned to rotate within said housing, bearing means for supporting said rotor in a vertical position including magnetic means providing magnetic forces for supporting the lower portion of said rotor member free of contact with other members, and centering means coacting with the upper portion of said rotor member, a conductive plate-like member having the shape of a segment of a hollow sphere concentric with the centering means and symmetrical about and secured to the rotor, field-producing means in close proximity to and on opposite sides of said plate-like member for rotating the same, said field-producing means including a first winding connected in series with an external circuit for producing a field proportional to the current flowing in said circuit, and a second winding in parallel with said circuit for producing a field proportional to the potential across said circuit, a pair of electrodes sealed and extending into said housing on opposite sides of said plate-like member, said plate-like member having a portion thereof which when aligned with said electrodes defines a discharge path through the gas-filling, means to apply to the electrodes a potential at which a discharge occurs therebetween during each revolution of the rotor, and counting means coupled to the electrodes and to said current responsive winding whereby the discharge current traverses the same and the revolutions of said rotor are counted.

References Cited in the file of this patent
UNITED STATES PATENTS

| | | |
|---|---|---|
| 605,949 | Duncan | June 21, 1898 |
| 611,809 | Evershed | Oct. 4, 1898 |
| 932,481 | Lord et al. | Aug. 31, 1909 |
| 1,707,291 | Waite | Apr. 2, 1929 |
| 1,997,831 | Mitsuda | Apr. 16, 1935 |
| 2,254,698 | Hansen | Sept. 2, 1941 |
| 2,315,408 | Faus | Mar. 30, 1943 |
| 2,320,946 | Madden | June 1, 1943 |
| 2,436,939 | Schug | Mar. 2, 1948 |
| 2,467,243 | Tillman | Apr. 12, 1949 |
| 2,593,973 | Briggs | Apr. 22, 1952 |
| 2,747,944 | Baermann | May 29, 1956 |